Patented Mar. 29, 1932

1,851,660

UNITED STATES PATENT OFFICE

JOHN J. FRED BRAND, OF ROSEVILLE, OHIO, ASSIGNOR OF ONE-THIRD TO ARTHUR H. PEMBERTON, OF ROSEVILLE, OHIO, AND ONE-THIRD TO GEORGE C. EARLE, OF ZANESVILLE, OHIO

VESICULATED BRICK AND SIMILAR ARTICLE AND PROCESS OF MAKING THE SAME

No Drawing. Application filed June 28, 1928. Serial No. 289,087.

The invention forming the subject matter of this application relates to the manufacture of brick, building blocks, tile, terra cotta and similar articles adapted for use in the construction of buildings and similar structures.

The main object of the invention is to provide an article of the class referred to having less than 70 per cent of the weight of similar products made from clay as ordinarily worked; thereby effecting tremendous savings in freight, handling, and erection charges, with greatly reduced dead weight loads in structures resulting in marked economies in structural requirements.

Another object of the invention is to produce an article of the character referred to, which can be rapidly and cheaply manufactured, which is fireproof, non-corrosive, capable of being glazed, enamelled and veneered, and possessing characteristics adapting it for wide variations in natural or artificial coloring and in texture.

A further object of the invention is to provide blocks or bricks adapted for use in all classes of construction, which can be sawed into any desired shape, or have nails driven into them to hold wood, metal, or any other material in place thereon.

Still another object of this invention is to provide a process for making articles of this type, mainly from raw materials unsuitable for use in the manufacture of brick as commonly carried out.

The foundation material of this invention is a vesiculated or cellular argillaceous acid proof and refractory material resulting from the subjection of raw argillaceous materials to the process steps of burning and grinding as set forth hereafter:

As is well known in this art, clay, shale and other argillaceous materials are not water hardened; and, where this type of raw material has been used heretofore in the manufacture of water hardened bricks and the like, it has been necessary to put the raw argillaceous materials through burning and grinding operations as a preliminary to mixing with cement to be moulded and set without final burning. Prior processes of this nature are clearly disclosed in the United States patent to Hayde No. 1,255,878, February 12, 1918 and reissued as No. 16,750 September 27, 1927.

Instead of using Portland or other cement or lime and water to be mixed with the ground burnt argillaceous material to form a plastic mass for moulding into brick, the present invention utilizes a clayey material to mix with the ground and burnt argillaceous material, and, through a final burning, produces the finished product.

While the preliminary process steps resemble somewhat the steps involved in the Hayde process, and the raw argillaceous materials are substantially the same, the resulting product in the present invention is different, possesses wholly different characteristics, and can be used for wholly different purposes.

In the present invention the raw material, derived from natural deposits of clay, shale or other argillaceous materials, is put through dry pans, jaw crushers and the like, and is reduced to sizes which will pass through openings of about 1½″ in diameter.

When the raw clayey material has been reduced to size, it may be fed directly into a rotary or other type of kiln, and brought up by comparatively rapid increments of temperature to a point where the clayey material exhibits incipient fusion. This point of fusion may be reached anywhere between 1,500 and 3,200 degrees Fahrenheit, depending upon the nature of the raw argillaceous material used.

The object of this part of the present process, and in which it differs materially from all prior processes is to prevent any considerable escape of gases from the organic matter contained. When the temperature reaches this critical point, it is held there, and as the heating continues at constant temperature, the organic matter decomposes to form gases, which are entrapped as bubbles, due to the control of temperature to maintain high viscosity and prevent their escape. These inwardly retained gases produce an action somewhat similar to that of gases confined within leavened wheat dough.

The heating just referred to is continued at constant temperature until the whole mass has been brought to this temperature to complete the vesiculating action of the gases. The resultant product is a vitrified mass, of abnormal porosity as compared with ordinary clay products, impervious, of great structural strength, and highly resistant to destructive influences of the weather and elements.

The burnt product is discharged from the kilns in clinker form, after which it is ground and separated into the desired sizes; which sizes, of course, depend upon the nature of the finished product in which the burnt vesiculated material is intended to be used. The coarser sizes may be used in rough aggregates forming floors or walls intended to receive a finishing coat, while the finer sizes may be employed where the product, in the form of bricks, etc., forms its own finished surfaces.

The graded clinkery or vesicular material is then mixed with ground or soft, raw, unburned plastic clay material, the proportions varying with the size of the vesicular product, plasticity of clay, type and shape of product, the latter of which governs to a large extent the molding process necessary.

Preferably two parts of the raw, unburned clay material is brought into intimate contact in a mixing or pugging machine with six parts of the vesiculated material, and one part water, where the ingredients are thoroughly incorporated with one another; after which the plastic material is pressed, or molded into the shape of the desired article.

After molding, the article is taken to a dryer, of any well known type, either natural or artificial, where the article remains until dry. From the dryer the article is transferred to an oven or kiln, where it is burned at temperatures ranging from 1,400 degrees F., to 3,000 degrees F., the exact temperature required depending upon the nature of the raw material and product desired. After cooling the article is ready for use.

Among the advantages of this process are quick drying and burning without the usual disastrous results, thus effecting great economies in fuel and damaged ware. For example, ordinary clay products require a drying period of at least forty eight hours and one hundred and forty four to two hundred hours as a burning period, while this new product, because of its low content of unburned clay, requires less than one half of the above figures, with a resultant doubling of capacity of manufacture and much lowering of investment in equipment and costs.

Compared with cement products, which require at least twenty eight days to reach maximum strength, this product is at full strength as soon as taken from kilns, having a compressive strength of well above 2,500 lbs. per square inch.

Building units made of this body mixture weigh less than 70 percent of those made of ordinarily worked clay, and this results in tremendous savings in freight, handling, and erection charges, with greatly reduced dead weight load in structures, resulting in marked economies in structural requirements.

The product also possesses low thermal conductivity, high porosity, abrasiveness, a high degree of workability such as cutting and nailing, well adapted to receive paint or the like, and in its simplest form presents an ideal base to receive plaster. Another important advantage is economy in manufacture, as by far the greater portion of the body which consists of vesicultated material is previously burned in kilns of higher thermal efficiency than is possible in the ordinary ceramic firing kiln. This material in combination with a relatively low clay content results in a total absence of laminations and destructive air pockets and blebs in the molded and finished article, thus materially reducing the number of rejects which otherwise occur. Building units of larger and more economical dimensions are as readily made as the smaller units, resulting in economies in handling and laying.

The raw material may contain extraneous materials such as gravel, pebbles, sand or other substances, which may be limey in character or otherwise, depending upon the nature and character of the natural deposit in which said argillaceous material is found. Where the raw material does contain materials as above, either by reason of their natural incorporation or because of additions thereto, and this material is brought to the vesiculating process after having passed over a coarse screen, the resulting burned product will consist of a mixture ranging in physical characteristics from that of very friable particles through the less friable and denser particles to the substantially unaffected clinker like portions.

Any limey ingredients would of course be converted during the burning into quick-lime some of which would be absorbed by the acid members of the batch. After cooling, the material may or may not be separated on the basis of the apparent specific gravity of the several portions, and lime present may be slaked, additions in the way of other vesiculated or unvesiculated earthy materials may be made. These not necessarily in the exact order named. If the raw material be brought to the vesiculating process in a specially prepared homogeneous condition, then a more uniform product as to apparent specific gravity will result, which type of product also, may or may not receive additions substantially as above.

Having decided as to the nature of the final product desired, the vesiculated material having been prepared accordingly, the next step is the compounding of the proper body mixture.

The preferred method of making up the moldable mixture consists of adding ground or finely divided raw clay, shale or other argillaceous materials as the bonding agent of the prepared and selected vesiculated material. Such bonding materials may be used in their natural condition or fortified with any of the well known simple or compounded fluxing agents, or coagulating agents or gums, adhesives, etc. This type of binder may be used in any desired proportion, varying from the mere covering of the irregular surfaces of the vesiculated material up to the filling of all voids between them. Such a bond gives good molding qualities to the mass, produces a high strength to the dried article and an ideal bond to the burned product.

A somewhat better product may be secured by using an argillaceous material containing some limestone or other base capable of causing release of gases when brought into contact with an acid or such base may be added, preferably before grinding and screening, as in these operations, the base becomes very thoroughly disseminated, even before the screened material reaches the mixing machine proper. The material with its base is then ground and screened to pass thru openings of about $\frac{1}{16}$ inch in diameter; and this finely subdivided material, together with an acid and water sufficient to form a plastic mass, is brought to a pugmill or other type mixing machine where it is thoroughly mixed, then is allowed to "raise" or swell, not unlike a leavened dough, resulting in a vesicular structure.

The leavened vesicular mass is then dried and burned to incipient vitrification of the surface, then the burning is continued at substantially constant temperature, as already described, to entrap the abnormal quantity of gas bubbles produced in this way.

After the burned vesiculated material has been cooled it is then reduced to the desired sizes, mixed with raw unburned argillaceous material, brought to a plastic state by the addition of water, then molded to the desired shape, which is then dried and burned in the same manner as any other ceramic body.

If a vesiculated material is to be made for use in refractories there would, of course, be a more careful selection of the raw materials, and instead of using bases and acids which would lower refractoriness, we would use such as did not have this effect upon the clays. For instance in this case we would use a non-fluxing base, such as ammonium bi-carbonate and any cheap non-fluxing acid, such as hydrochloride or acetic. Otherwise a wide range of acid and base combinations may be made and may be changed from time to time in accordance with the cost per unit of gases available. The quantity of gas necessary per ton of clay material depends upon the results sought and the character of the clayey material. However 20 cu. ft. @ 32 degrees F. per ton will be found a satisfactory amount in most cases.

The computations necessary to arrive at the proper quantity of base and the proportioning of the acid are readily made by those skilled in the science of stoichiometry.

After the material has been burned it is brought to the desired sizes, mixed with raw unburned clay, shale or other argillaceous material and water added to form a plastic mass, molded dried and burned as already described.

I claim:

1. The process of making brick or similar articles, which consists in grinding, to pass through openings about 1/16 inch diameter, raw unburned argillaceous material, mixed with a base and an acid capable of causing a release of gases when brought into contact with each other, adding water to said crushed material in quantity sufficient to form a plastic mass, agitating the plastic mass to cause intimate mixture of its ingredients and cause vesiculation thereof, drying and burning the vesicular mass to a point where water is incapable of mixing therewith to form a plastic moldable mass, crushing the dried and burned vesiculated material, mixing the crushed vesiculated material with raw unburned argillaceous material and forming the article to be produced from the last named mixture.

2. The process of making brick or similar articles which consists in grinding, to pass through openings about 1/16 inch dimaeter, raw unburned argillaceous material mixed with a base and an acid capable of causing a release of gases when brought into contact with each other, adding water to said crushed material in quantity sufficient to form a plastic mass, agitating the plastic mass to cause intimate mixture of its ingredients and cause vesiculation thereof, drying and burning the vesicular mass to a point where water is incapable of mixing therewith to form a plastic moldable mass, crushing the dried and burned vesiculated material, mixing the crushed vesiculated material with raw unburned argillaceous material, adding water to form a plastic moldable mass, molding the article to be produced from said mass, and burning the molded mass to form the finished article.

3. The process of making an abnormally porous aggregate which consists in raising the temperature of argillaceous material until vitrification of the surface begins; then arresting the rise of temperature and causing the vitrification to progress inward throughout the mass at substantially constant temperature.

4. The process of making an abnormally porous aggregate which consists in raising the temperature of argillaceous material until vitrification of the surface begins; then arresting the rise of temperature and causing the vitrification to progress inward throughout the mass at substantially constant temperature, to maintain a degree of viscosity adapted to prevent bursting of bubbles in zones of higher temperature before bubbles are formed in zones of lower temperature; then cooling the mass to fix the resulting abnormal porosity.

5. The process of making an abnormally porous aggregate, suitable as an ingredient of a molded product, which consists in adding gas producing ingredients to a mass of argillaceous material; then raising the temperature of the mass until vitrification of the surface begins; then arresting the rise of temperature and causing the vitrification to progress inward throughout the mass at substantially constant temperature.

6. The process of making an abnormally porous aggregate, suitable as an ingredient of a molded product, which consists in adding acid and basic substances to a mass of argillaceous material to produce gas bubbles; then raising the temperature of the mass until vitrification of the surface begins; then arresting the rise of temperature and causing the vitrification to progress inward throughout the mass at substantially constant temperature.

In testimony whereof I affix my signature.

JOHN J. FRED BRAND.